(12) United States Patent
Sund et al.

(10) Patent No.: US 12,544,444 B2
(45) Date of Patent: Feb. 10, 2026

(54) ADMINISTRATION OF TAILORED FEEDSTOCK TO INCREASE ANTIBIOTIC SUSCEPTIBILITY

(71) Applicant: U.S. Government, as represented by the Sec. of Army, c/o CCDC Army Research Laboratory, Adelphi, MD (US)

(72) Inventors: Christian J. Sund, Bethesda, MD (US); Katherine L Germane, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1080 days.

(21) Appl. No.: 16/548,546

(22) Filed: Aug. 22, 2019

(65) Prior Publication Data
US 2019/0374648 A1 Dec. 12, 2019

Related U.S. Application Data

(62) Division of application No. 15/939,329, filed on Mar. 29, 2018.

(51) Int. Cl.
| | | |
|---|---|---|
| A61K 47/26 | (2006.01) |
| A61K 9/00 | (2006.01) |
| A61K 31/4164 | (2006.01) |
| A61P 31/04 | (2006.01) |

(52) U.S. Cl.
CPC ............ *A61K 47/26* (2013.01); *A61K 9/0019* (2013.01); *A61K 31/4164* (2013.01); *A61P 31/04* (2018.01)

(58) Field of Classification Search
CPC .. A61K 47/26; A61K 9/0019; A61K 31/4164; A61P 31/04
See application file for complete search history.

(56) References Cited

U.S. PATENT DOCUMENTS

| | | | |
|---|---|---|---|
| 4,371,540 A | 2/1983 | Lee et al. | |
| 8,841,279 B2 | 9/2014 | Taylor et al. | |
| 9,364,467 B2 | 6/2016 | Golden et al. | |
| 2010/0152122 A1 | 6/2010 | Taylor et al. | |
| 2012/0129905 A1* | 5/2012 | Murakami | A61K 47/22 514/398 |

FOREIGN PATENT DOCUMENTS

WO 2008057802 5/2008

OTHER PUBLICATIONS

Clendenon et al (Year: 1980).*
Barker (Year: 1985).*
Clendenon (Year: 1980).*
Vepkhvadze, SciFinder Scholar Abstract Translation (Year: 1984).*
Millipore catalog information (Year: 2023).*
LookChem Catalog Information (Year: 2023).*

* cited by examiner

*Primary Examiner* — Jeffrey S Lundgren
*Assistant Examiner* — Ibrahim D Bori
(74) *Attorney, Agent, or Firm* — Eric B. Compton

(57) ABSTRACT

A method for increasing susceptibility of microorganisms to antibiotics includes providing a microorganism; administering a single type of an antibiotic including a nitroimidazole compound to the microorganism; and administering any of an uronic, aldonic, ulosonic, and aldaric feedstock to the microorganism. The feedstock is adapted to promote cell metabolism and antibiotic activation, and inhibit antibiotic inactivation pathways in the microorganism causing increased sensitivity of the microorganism to the nitroimidazole.

15 Claims, 3 Drawing Sheets

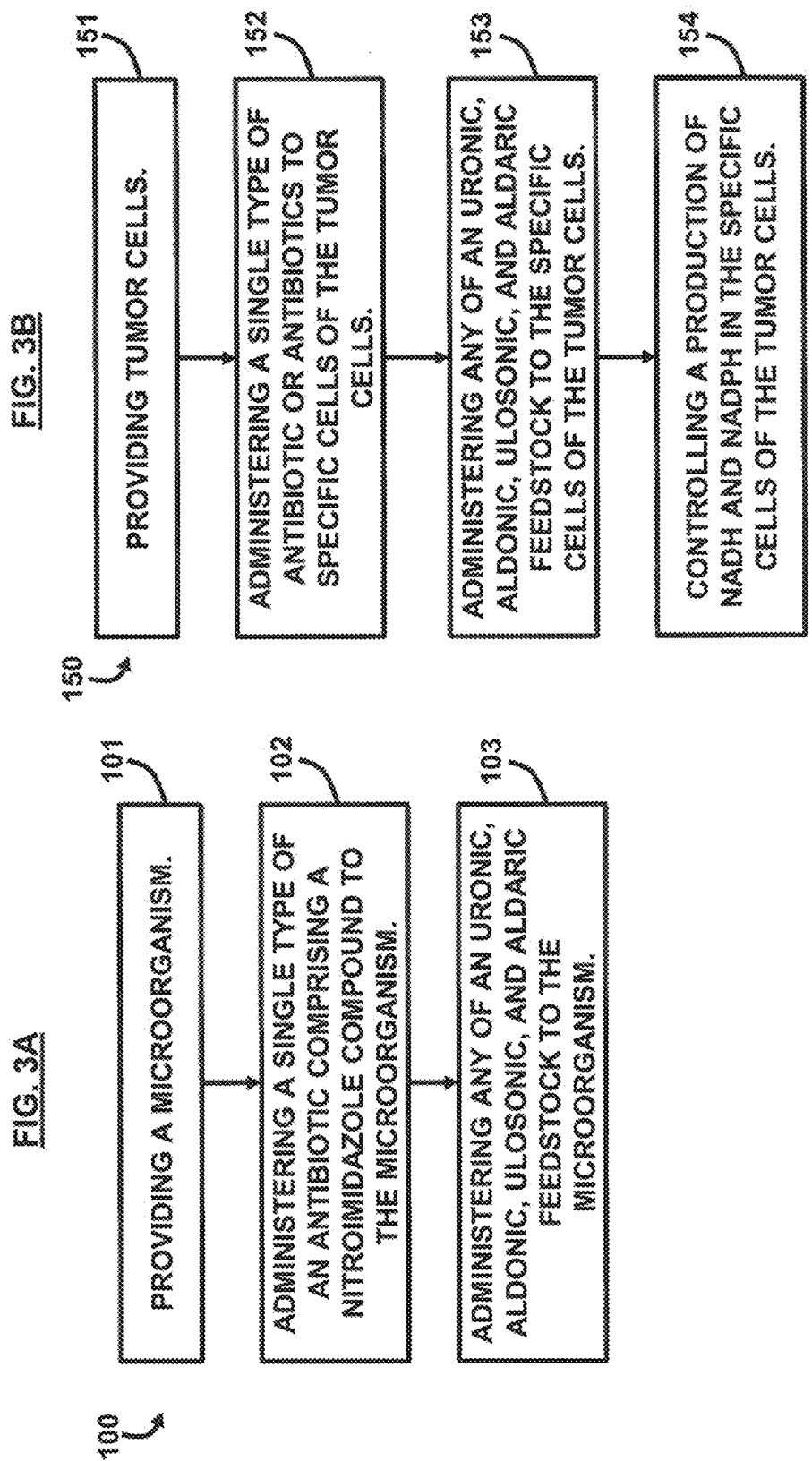

ADMINISTRATION OF TAILORED FEEDSTOCK TO INCREASE ANTIBIOTIC SUSCEPTIBILITY

RELATED APPLICATION DATA

This application is a divisional of U.S. patent application Ser. No. 15/939,329 filed Mar. 29, 2018 which is herein incorporated by reference in its entirety.

GOVERNMENT INTEREST

The embodiments herein may be manufactured, used, and/or licensed by or for the United States Government without the payment of royalties thereon.

BACKGROUND

Technical Field

The embodiments herein generally relate to a method for increasing susceptibility of microorganisms to antibiotics. The embodiments herein also relate to a method for enhancing susceptibility of tumor cells to nitroimidazole.

Description of the Related Art

Within this application there are several patents and publications that are referenced. The disclosures of all these patents and publications, in their entireties, are hereby expressly incorporated by reference into the present application.

Nitroimidazoles are a class of chemical compounds with active imidazole ring and nitro group at 2'- or 5'-positions. Nitroimidazole antibiotics may be classified according to the location of the nitro group. Drugs of the 5-nitro variety include metronidazole, tinidazole, nimorazole, dimetridazole, 6-Amino PA824, ornidazole, megazol, and azanidazole. Drugs based on 2-nitroimidazoles include benznidazole. Nitroimidazole antibiotics have been used to combat anaerobic microorganism and parasitic infections. This class of chemical compounds requires reduction at the nitro group in order to be transformed into its cytotoxic form, the nitroradical anion. Nitroimidazoles' intracellular activation occur through reduction by the low electron potential couple, pyruvate:ferredoxin oxidoreductase (PFOR) or ferredoxin (fd) which are prevalent during anaerobic metabolism. The electron reduction results in free radical formation that leads to covalent modification of nucleic acids and essential proteins, thereby inactivating them, leading to cell death and causes oxidative damages to cellular components. Further, low oxygen content in tumor cells was recently discovered as important quantitative measurement technique useful in cancer therapy and diagnosis. Both properties of nitroimidazole cytotoxicity and oxygen sensitivity place the nitroimidazole compounds in the class of tumor therapy and hypoxia detection.

U.S. Pat. No. 4,371,540 issued to Lee et al. teaches methods for 2-nitroimidazoles that have improved radiosensitizing capability suitable for clinical use to radiosensitize hypoxic cell.

U.S. Pat. No. 8,841,279 issued to Taylor et al. teaches a pharmaceutical composition comprising an oligoguluronate or oligogalacturonate and a macromolecular used to facilitate uptake from mucosal surfaces of macromolecular drugs; i.e., drugs having a molecular weight above 2000 Da when they are co-administered.

There are no current methods or additives to increase susceptibility of cells to antibiotics, such as nitroimidazoles, unless an additional antibiotic is administered. Therefore, there is a need to develop a more convenient approach to increase susceptibility of microorganisms to antibiotics in fighting infections and help treatment of tumors through radiology, thereby reducing side effects associated with antibiotic treatment and decreasing the need for exposure to radiation.

SUMMARY

In view of the foregoing, an embodiment herein provides a method for increasing susceptibility of microorganisms to antibiotics, the method comprising providing a microorganism; administering a single type of an antibiotic comprising a nitroimidazole compound to the microorganism; and administering any of an uronic, aldonic, ulosonic, and aldaric feedstock to the microorganism, wherein the feedstock is adapted to promote cell metabolism and antibiotic activation, and inhibit antibiotic inactivation pathways in the microorganism causing increased sensitivity of the microorganism to the nitroimidazole. The nitroimidazole compound may comprise any of metronidazole, tinidazole, ornidazole, nimorazole, secnidazole, azanidazole propenidazole, and nitroimidazole derivatives. The feedstock may comprise a sugar acid or a combination of sugar acids comprising any of an uronic, aldonic, ulosonic, and aldaric acid.

The method may comprise metabolizing gluconate from the glucuronic acid by producing adenosine triphosphate (ATP) and reduced ferredoxin. The feedstock may be adapted to decrease production of NADH and NADPH in the microorganism. The method may comprise activating the nitroimidazole compound causing metabolic activation of the microorganism. The method may comprise administering the feedstock as a supplement for oral antibiotics. The feedstock may comprise an aqueous solution or a solid form. The method may comprise decontaminating the microorganism. The method may comprise administering the feedstock by intravenous injection, subcutaneous injection, or intraperitoneal injection.

Another embodiment provides a method for treatment, according to an embodiment herein. The method comprises providing tumor cells; administering a single type of antibiotic or antibiotics to specific cells of the tumor cells; administering any of an uronic, aldonic, ulosonic, and aldaric feedstock to the specific cells of the tumor cells; and controlling a production of NADH and NADPH in the specific cells of the tumor cells, wherein the feedstock is adapted to promote cell metabolism and antibiotic activation, and inhibit antibiotic inactivation pathways in the specific cells of the tumor cells causing increased sensitivity of the specific cells to the antibiotic or antibiotics. The tumor cells may comprise any of colorectal tumor cells, stomach tumor cells, brain tumor cells, lung tumor cells, pancreatic tumor cells, liver tumor cells, prostate tumor cells, tumor cells of neck, breast tumor cells, and tumor cells of the oral cavity. The antibiotic or antibiotics may comprise any of metronidazole, tinidazole, ornidazole, nimorazole, secnidazole, azanidazole propenidazole, and nitroimidazole derivatives. The feedstock may comprise a sugar acid or a combination of sugar acids comprising any of an uronic, aldonic, ulosonic, and aldaric acid.

The method may comprise metabolizing gluconate from the glucuronic acid by producing ATP and reduced ferredoxin. The method may comprise activating the antibiotic or antibiotics causing metabolic activation of the tumor cells. The method may comprise administering any of the feedstock as a supplement for oral antibiotics. The feedstock may comprise an aqueous solution or a solid form. The method may comprise administering the feedstock by intravenous injection, subcutaneous injection, or intraperitoneal injection. The method may comprise administering the feedstock before or during administering radiation on the tumor cells.

BRIEF DESCRIPTION OF THE DRAWINGS

The embodiments herein will be better understood from the following detailed description with reference to the drawings, in which:

FIG. 3A is a flow diagram illustrating a first method; and
FIG. 3B is a flow diagram illustrating a second method.

DETAILED DESCRIPTION

Figure 1:
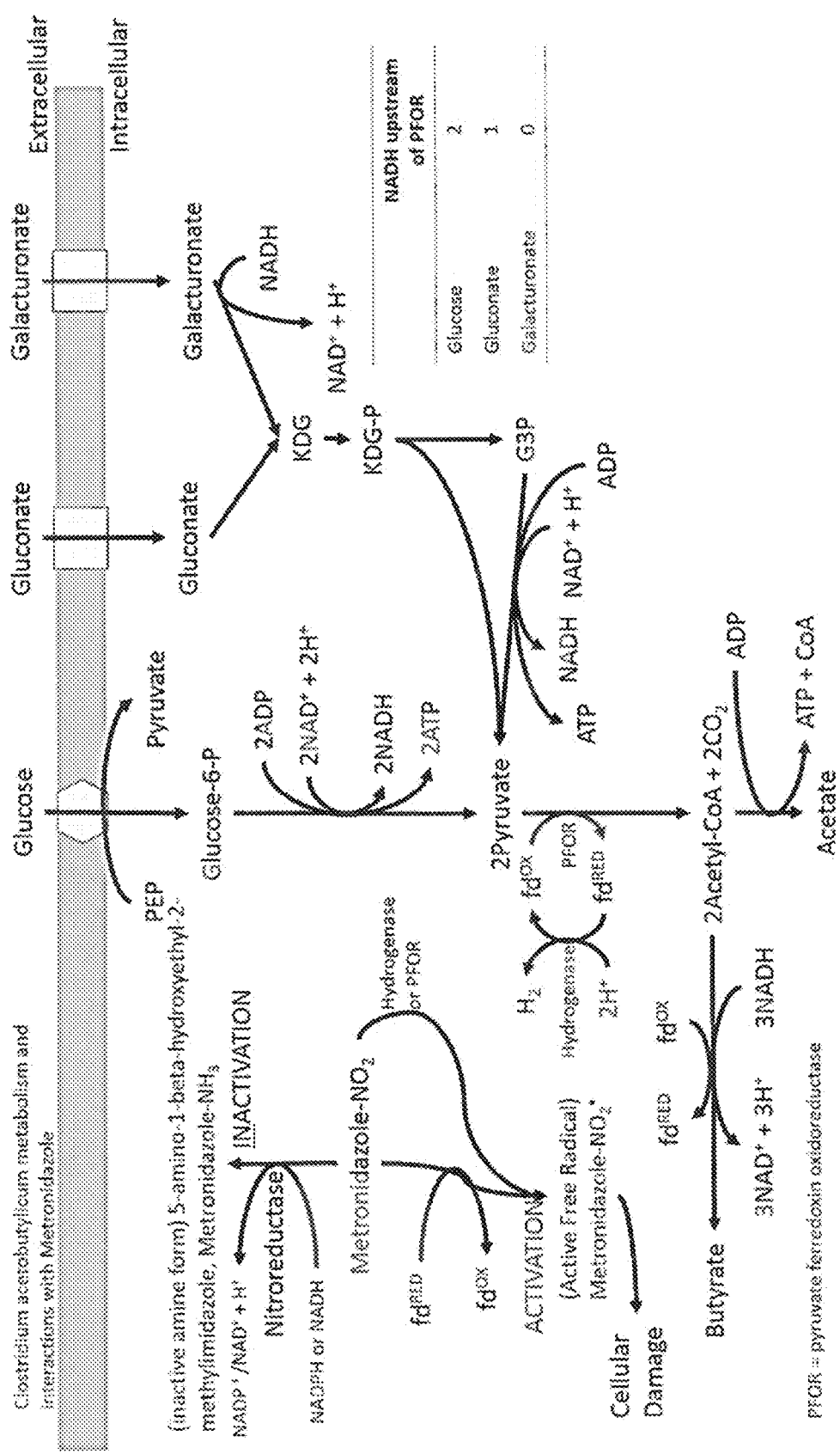
FIG. 1 illustrates a method of increased susceptibility of *C. acetobutylicum* to metronidazole during growth on galacturonate and gluconate when compared to growth on glucose.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Antibiotics are more effective in cells with active metabolism. Nitroimidazoles require intracellular activation through one electron reduction, mediated by low potential electron donors, such as reduced ferredoxin, which are prevalent during anaerobic metabolism. The free radical formed in this process then causes oxidative damages to cellular components. Other effects of nitroimidazoles may include DNA strand breakage, or possible inhibition of DNA repair mechanisms. Inactivation of Nitroimidazoles is through reduction of nitro groups ($-NO_2$) to hydroxylamines ($-NHOH$) and amines ($-NH_4$). This process requires nitroreductases or other redox enzymes to reduce the nitro groups while oxidizing intracellular electron carriers such as NADH, NADPH, thioredoxin, flavodoxin, rubredoxin, etc. Nitromidizoles lead to oxidative damage which is repaired by redox active enzymes that reduce oxidized molecules via enzyme systems also requiring electron donors such as NADH, NADPH, thioredoxin, flavodoxin, rubredoxin, etc. The embodiments herein provide a treatment strategy where the cells are fed any of an uronic, aldonic, ulosonic, and aldaric acid or salt based feedstock that results in intracellular production of ATP and reduced ferredoxin coupled with decreased production of NADH and NADPH. As a result, the cells are metabolically active, may activate nitroimidazoles, but have diminished capacity to reduce nitroimidazoles to their inactive form and a diminished capacity to repair oxidative damage. The combined effect is that cells have increased sensitivity to nitroimidazoles.

The embodiments herein relate to a method for increasing the susceptibility of microorganisms to antibiotics. The methods for increasing microorganisms to antibiotics comprise administering the uronic, aldonic, ulosonic, and/or aldaric substrates or feedstocks which activate metabolism of cells. More particularly, the embodiments herein provide for administering effective amount of nitroimidazole and uronic, aldonic, ulosonic, and/or aldaric substrates or feedstocks to microorganisms. Additionally, the embodiments herein provide a method for enhancing susceptibility of tumor cells to radiation through the use of antibiotics.

Another embodiment herein provides a method for enhancing susceptibility of tumor cells to radiation through the use of antibiotics. More particularly, the methods for increasing tumor cells to antibiotics comprise administering nitroimidazoles and uronic, aldonic, ulosonic, and/or aldaric substrates or feedstocks in effective amount to increase tumor cell sensitivity to radiation therapy. Particular embodiments use substrates; e.g., uronic, aldonic, ulosonic, and/or aldaric acids or salts that promote cell metabolism and antibiotic activation but also inhibit pathways required for antibiotic inactivation and/or repair of antibiotic damage. In particular embodiments, intracellular NADH may be decreased through the administration of oxidized substrates such as galacturonic acid or glucuronic acid to *C. acetobutylicum*. Referring now to the drawings, and more particularly to FIGS. 1 through 3B, where similar reference characters denote corresponding features consistently throughout the figures, there are shown preferred embodiments.

"Antibiotics" as used herein refers to drug used in the treatment and prevention of bacterial infections, or any substance used against microbes.

"Microorganism" as used herein refers to unicellular or multicellular organisms, includes bacteria, archaea, protists, protozoans, or eukaryotes; e.g., human, animal, and plant cells.

"Anaerobic organism" as used herein refers to any organism that may not or must not require oxygen for growth, organism may be unicellular or multicellular organism.

"Effective amount" is used herein to denote a quantity or concentration of that antibiotics and/or substrate is known to be effective to achieve the desired and known result of the antibiotics and/or substrate. The actual amount contained in the molecular complex or composition, likely will vary since some of the antibiotics and/or substrate composition may not completely penetrate the microorganism together. Using the guidelines provided herein, those skilled in the art are capable of determining the acceptable amount of antibiotics and substrate described herein, and to use the requisite amount. For example, a suitable dosage adjustment may be made by the attending physician or veterinarian depending upon the age, sex, weight and general health of the subject. Such a composition may be administered parenterally, optionally intramuscularly or subcutaneously. However, the composition may also be formulated to be administered by any other suitable route, including orally or topically.

In another embodiment, the nitroimidazole compound of the composition may include, but are not limited to, compounds such as metronidazole, tinidazole, ornidazole, nimorazole, secnidazole, azanidazole or propenidazole.

A common carbohydrate such as glucose a type of aldose, is oxidized at carbon one position from aldehyde to carboxyl group, the product is called aldonic acid, or more specifically gluconic acid. The aldonic acid usually has multiple hydroxyl groups. The general chemical formula is HOOC—$(CHOH)_n$—$CH_2OH$. Oxidation of the terminal hydroxyl group occurs instead of the terminal aldehyde and yields a uronic acid, while oxidation of both terminal ends yields an aldaric acid. Aldonic acid may exist as stereoisomers as D, L, and DL or R, S and RS forms. Hence D-glucose is oxidized to D-gluconic acid and D-gluconolactone.

In one embodiment, any of the uronic, aldonic, ulosonic, and aldaric feedstock may be an aqueous solution or solid form. Thus, for example it may be in tablet, coated tablet, delayed or sustained release coated tablet, capsule, suppository, pessary, gel, emulsion, syrup, dispersion, suspension, emulsion, powder, cream, paste, etc.

In another embodiment, any of the uronic, aldonic, ulosonic, and aldaric feedstock may be administered as a supplement for oral antibiotics, such as an antibiotic chaser in a shake or drink form.

In one embodiment, any of the uronic, aldonic, ulosonic, and aldaric feedstock may be administered with two or more different therapeutic compounds; e.g., with two different antibiotics. Two different antibiotics with substrates may be administered either in the same formulation or in a separate formulation, either concomitantly or sequentially.

Antibiotics against anaerobes microorganisms include penicillin G, chloramphenicol, imipenem, ampicillin-sulbactam, clindamycin, cefoxitin, piperacillin, ceftizoxime, cefoperazone, erythromycin, moxalactam, cefotetan, cefipime or a combination of antibiotics.

In one embodiment, nitroimidazole; e.g., metronidazole, is effective for the treatment of anaerobic infections, such as intra-abdominal infections, gynecologic infections, septicemia, endocarditis, bone and joint infections, central nervous system infections, respiratory tract infections, skin and skin-structure infections, and oral and dental infections.

In another embodiment, nitroimidazole and any of the uronic, aldonic, ulosonic, and aldaric feedstock may be used with other antibiotics for treatment of mixed aerobic and anaerobic infection, or in combination with other antibacterial agents that are appropriate for the treatment of the aerobic infection, or other anaerobic infections.

The composition of the embodiments herein may be administered to any part, organ, interstice or cavity of a human or non-human body that is subject to an infection or radiation. For example, the composition may be administered by, but not limited to, oral and non-oral preparations (e.g., intramuscular, subcutaneous, transdermal, visceral, IV (intravenous), IP (intraperitoneal), intraarticular, placement in the ear, ICV (intracerebralventricular), intraarterial, intrathecal, intracapsular, intraorbital, injectable, pulmonary, nasal, rectal, and uterine-transmucosal preparations).

In some embodiments, a process of decontaminating the surface occurs by applying the feedstock or substrate with antibiotics to a surface that is contaminated with one or more microbes. Any delivery mechanism for decontaminating a surface may be used including spraying, immersing, or other contact mechanism.

Some embodiments herein provide increasing tumor cells by administering antibiotics selected from nitroimidazoles in an effective amount with any of the uronic, aldonic, ulosonic, and aldaric feedstock into a sample, in-vivo; e.g., human or non-human, or in-vitro, may occur during or prior to subjecting sample to radiation therapy.

In one embodiment, tumor cells may include, but are not limited to, colorectal tumor, stomach tumor, brain tumor, lung tumor, pancreatic tumor, liver tumor, prostate tumor, tumor of neck, breast tumor, or tumor of the oral cavity.

Radiation may be delivered directly to tumor cells through the use of high-energy rays or beams; e.g., image guided radiation therapy (IGRT), intensity modulated radiation therapy (IMRT), or three-dimensional conformal radiation therapy (3D-CRT), etc. radiolabeled antibodies or radioimmunotherapy. Antibodies are highly specific proteins that are made by the body in response to the presence of antigens, e.g., substances recognized as foreign by the immune system. Some tumor cells contain specific antigens that trigger the production of tumor-specific antibodies.

FIG. 1 illustrates a method of increased susceptibility of C. acetobutylicum to Metronidazole during growth on galacturonate and gluconate when compared to growth on glucose. Metronidazole is a nitroimidazole agent having an antimicrobial activity and a broad spectrum of action both on Gram+ bacteria and Gram− bacteria. Conversion of galacturonate, gluconate, and glucose to acetyl-CoA produces similar amounts of ATP and reduced ferredoxin to help drive metabolism and metronidazole activation. Further, conversion of galacturonate, gluconate, and glucose to acetyl-CoA produces different amounts of NADH.

More particularly, FIG. 1 shows a schematic of how the feeding/antibiotic treatment method provided by the embodiments herein functions in C. acetobutylicum. FIG. 1 shows how three feedstocks (glucose, gluconate, and galacturonate) are assimilated into central metabolism. All three substrates produce two moles of pyruvate per mole of substrate and the pyruvate is converted to acetyl-CoA and $CO_2$ by pyruvate ferredoxin oxidoreductase (PFOR). PFOR, the hydrogenase, and reduced ferredoxin are capable of nitroimidazole activation. On a molar basis, all three feedstocks produce equivalent amounts of reduced ferredoxin and metabolize equivalent levels of pyruvate via PFOR indicating there is a similar capacity on all three substrates to activate nitroimidazoles. The substrates differ in the amount of NADH that is produced as shown in Table 1 below. Per mole of glucose the cells produce 2 moles of NADH upstream of pyruvate while during growth on galacturonate there is no net NADH production. The lack of NADH production reduces the capacity of the organism to inactivate the nitroimidazoles via nitroreductases or other related enzymes.

TABLE 1

| NADH/NADPH Production | |
|---|---|
| Substrate | NADPH produced upstream of PFOR |
| glucose | 2 |
| gluconate | 1 |
| galacturonate | 0 |

Cells may be more sensitive to certain antibiotics when grown on galacturonate because no net NADH/NADPH production occurs upstream of the PFOR, yet there is still flux through the PFOR and ATP production. NADH or NADPH is required to reduce an antibiotic (e.g., Metronidazole, for example) to its inactive amine form. Flux through PFOR generates reduced ferredoxin, which is required for production of the active free radical form of the antibiotic. Glucose and gluconate metabolism produces net NADH/NADPH upstream for PFOR, which may be used to inactivate the antibiotic via nitroreductases and the cells would therefore be less susceptible to the antibiotic on these substrates when compared to galacturonate.

The feeding strategy provided by the embodiments herein and described in FIG. 1 may be utilized for a broad range of anaerobic organisms due to evolutionary conservation of the pathway for galacturonate metabolism and the need to reduce the substrate for entry into glycolysis. Depending on the target organism other feeding strategies, such as use of different aldonic and uronic acid carbohydrates, may be used to meet the criteria of providing ATP and reduced ferredoxin while minimizing the production of NADH/NADPH. Tumor cells are inherently anaerobic and nitroimidazoles are being used as antiangiogenic hypoxic cell radiosensitizers through their active intermediates. Accordingly, by decreasing the breakdown of the intermediates by the cells, the sensitivity increases.

The two main sources of reduced electron carriers in *C. acetobutylicum* are NADH from lower glycolysis and reduced ferredoxin from PFOR. Electron carriers are reoxidized by the hydrogenase, which couples ferredoxin oxidation with proton reduction, and by reductive conversion of acetyl-CoA to butyrate. Cells gain one ATP per acetyl-CoA by conversion to acetate, as opposed to 0.5 ATP per acetyl-CoA generated during reduction to butyrate. It is therefore more favorable from the standpoint of ATP yield to use the hydrogenase to reoxidize electron carriers. Electrons may be shuffled between NADH and ferredoxin by the NADH-ferredoxin oxidoreductase or butyryl-CoA dehydrogenase, thus it is possible for reducing equivalents formed in lower glycolysis to be oxidized indirectly via the hydrogenase.

In some embodiments, metabolism of gluconate and galacturonate results in less production of NADH/NADPH when compared to growth on glucose which impairs metronidazole inactivation and repair of oxidative damage. In anaerobes, redox-active enzymes such as pyruvate/ketoacid oxidoreductases and hydrogenase, active with the low-redox carriers (ferredoxin and flavodoxin), reduce 5-nitroimidazoles to mutagenic products that also cause DNA helix destabilization and single- and double-strand DNA breakage. Other enzymes and electron transfer components may also be involved in the process. The activated reduced metronidazole molecule binds nonspecifically to bacterial DNA, leading to a high level of DNA breakage.

In another embodiment, administering oxidized feedstock to *C. acetobutylicum*, antibiotic susceptibility increases at least one and a half fold or greater compared to administering glucose as a feedstock.

In another embodiment, the different components of the substrates may be packaged together with antibiotics or in separate containers. If appropriate, and mixed immediately before use, such packaging of the components separately may permit long-term storage without losing the active component's function. Sterilization may be preceded or followed by packing into containers. If desired, the composition of the embodiments herein may contain pharmaceutically acceptable additives, such as dissolving aids, buffering components, stabilizers, and the like. The antibiotics and/or substrates may be supplied in containers of any sort such at the life of the different components are preserved and are not adsorbed or altered by the materials of the container. For example, sealed glass ampules may contain lyophilized substrates and variants, derivatives and structural equivalents thereof, or buffers that have been packaged under a neutral, non-reacting gas, such as nitrogen. Other containers include test tubes, vials, flasks, bottles, syringes, or the like. Containers may have a sterile access port, such as a bottle having a stopper that may be pierced by a hypodermic injection needle. Other containers may have two compartments that are separated by a readily removable membrane that upon removal permits the components to be mixed. Removable membranes may be glass, plastic, rubber, etc.

Suitable pharmaceutically acceptable carriers facilitate administration of the antibiotic and substrate or feedstocks are physiologically inert and/or nonharmful. Carriers may be selected by one skilled in the art. Exemplary carriers include sterile water or saline, calcium phosphate, gelatin, dextran, agar, pectin, peanut oil, olive oil, sesame oil, and water. Additionally, the carrier or diluent may include a time delay material, such as glycerol monostearate or glycerol distearate alone or with a wax. In addition, slow release polymer formulations may be used.

The substrates or feedstock with or without antibiotic provided by the embodiments herein may additionally contain stabilizers such as thimerosal (ethyl(2-mercaptobenzoate-S)mercury sodium salt) (available from Sigma Chemical Company, St. Louis, Missouri), for example, or physiologically acceptable preservatives.

The composition provided by the embodiments herein may also contain conventional pharmaceutical ingredients, such as preservatives, or chemical stabilizers. Suitable ingredients operable herein include, for example, casamino acids, gelatin, phenol red, N—Z amine, monopotassium diphosphate, lactalbumin hydrolysate, and dried milk.

The nitroimidazole, may be formulated into a composition in a free base, neutral or salt form. Pharmaceutically acceptable salts include the salts formed with a free carboxyl group or amine group derived from inorganic bases such as for example, sodium, potassium, ammonium, calcium or ferric hydroxides; or such organic bases as isopropylamine, trimethylamine, histidine or procaine. The antibiotics and/or substrates may be stable under the conditions of manufacture and storage, and preserved against the contaminating action of microorganisms. It will be appreciated that endotoxin contamination should be kept minimally at a safe level.

Bacterial culture conditions and strains have been previously published. All strains and cultures were maintained or grown in in an atmosphere of 5.0% $H_2$, 5.0% $CO_2$, and 90.0% $N_2$. *Clostridium acetobutylicum* strain ATCC 824 was obtained from ATCC and cultured using company protocol at 37° C. into Clostridial growth medium or CGM containing 0.75 g $KH_2PO_4$, 0.75 g $K_2HPO_4$, 1.0 g NaCl, 0.017 g $MnSO_4.5H_2O$, 0.70 g $MgSO_4.7H_2O$, 0.01 g $FeSO_4.7H_2O$, 2.0 g 1-asparagine, 5.0 g yeast extract, 2.0 g $(NH_4)_2SO_4$, and 0.5% final concentration of desired carbohydrate—D-glucose, D-galacturonic acid, D-gluconic acid—at pH 6.5. Active cultures from initial growth stock were added to potato glucose medium to be maintained and stored as a spore solution. Potato glucose medium or PGM contains per liter of $H_2O$—150 g grated fresh potato, 10 g D-glucose, 0.5 g $(NH_4)SO_4$, and 3 g $CaCO_3$. The medium was boiled for 1 hour and strained through gauze before sterilization and use for culture. Spore solution was activated for culturing through a heat shock at 80° C. for 9 minutes. Shocked spore solution was added to CGM containing the feed stock of choice and grown to late log of 0.8 at optical density of 600 nm ($OD_{600}$) at 37° C. Theses cultures were then used to perform antibiotic sensitivity experiments.

The protocol for antibiotic sensitivity test was performed as follows in anaerobic conditions: 200 μL of CGM medium containing either 0.5% D-galacturonate or D-glucose was aliquoted into a sterile Costar® 96-well polystyrene flat bottom plate in triplicate per test condition. Metronidazole was dissolved in dimethyl sulfoxide at different concentrations. Each metronidazole concentration was added to each well in triplicate and considered a test condition. Test conditions included addition of 1 μL of DMSO, 1 μL of sterile water, 1 μL 0.1 mg $mL^{-1}$, 1 μL 0.25 mg $mL^{-1}$, 1 μL 0.5 mg $mL^{-1}$, 1 μL 1 mg $mL^{-1}$, 1 μL 2.5 mg $mL^{-1}$, 1 μL 5 mg $mL^{-1}$, 1 μL 10 mg $mL^{-1}$, 1 μL 20 mg $mL^{-1}$, and 1 μL 10 mg mL$^{-1}$. 10 μL of OD$_{600}$ 0.8 *Clostridium acetobutylicum* culture grown in CGM containing 0.5% D-galacturonate was aliquoted into each test condition containing D-galacturonic acid. 10 of OD$_{600}$ 0.8 *Clostridium acetobutylicum* culture grown in CGM containing 0.5% D-glucose was aliquoted into each test condition containing D-glucose. The final concentrations of metronidazole after addition of culture are as follows 0.0 μg mL$^{-1}$, 0.0 μg mL$^{-1}$ 0.47 μg mL$^{-1}$, 1.18 μg mL$^{-1}$, 2.37 μg mL$^{-1}$, 4.74 μg mL$^{-1}$, 11.85 μg mL$^{-1}$, 23.7 μg mL$^{-1}$, 47.4 μg mL$^{-1}$, 94.8 μg mL$^{-1}$, 142.0 μg mL$^{-1}$. The 96-well plate was covered and incubated for 24 hours at 37° C. The optical density of the cultures in the wells were measured at 600 nm via a commercially available plate reader.

Figure 2:
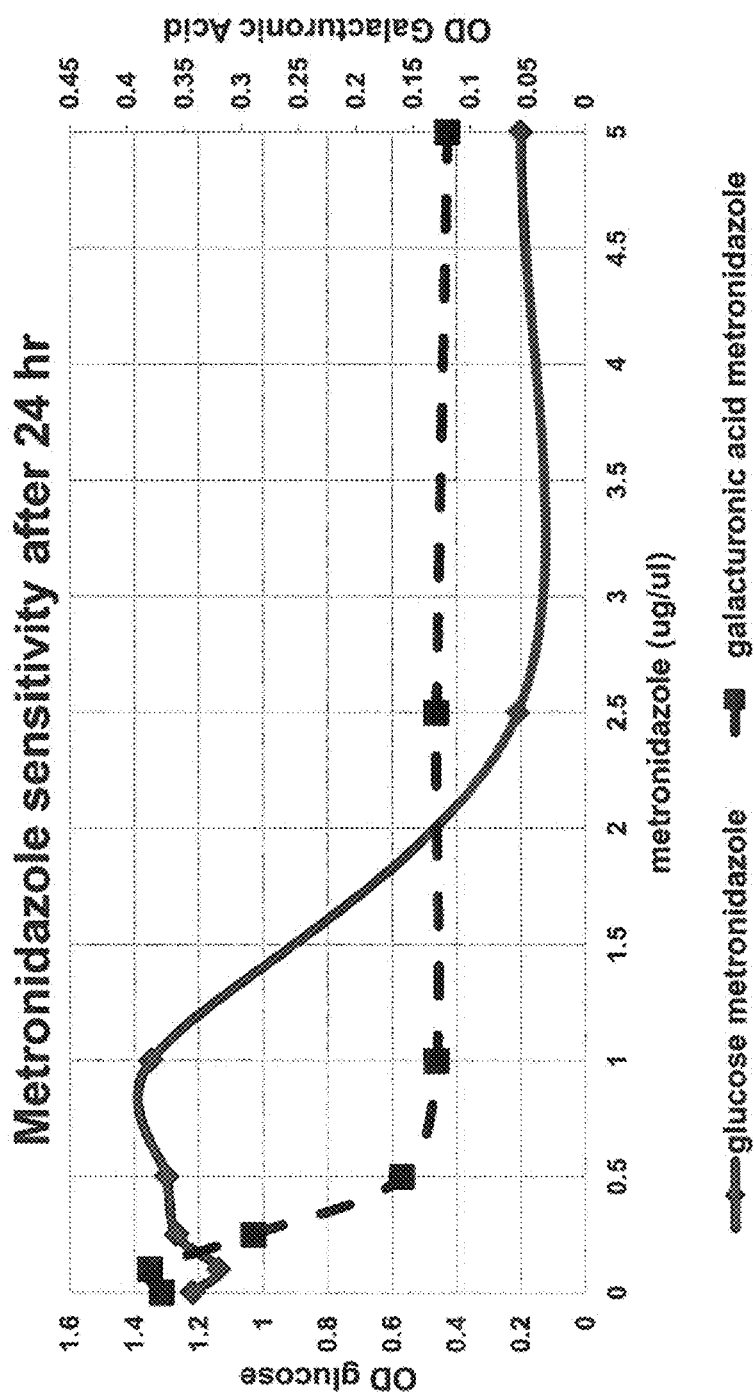
FIG. 2 is a graph illustrating metronidazole sensitivity after 24 hours.

As illustrated in FIG. 2, administering oxidized feedstock to *C. acetobutylicum*, antibiotic (metronidazole) susceptibility increases at least two-fold or greater compared to administering glucose as a feedstock.

FIG. 3A is a flow diagram illustrating a method 100 for increasing susceptibility of microorganisms to antibiotics, according to an embodiment herein. The method 100 comprises providing (101) a microorganism; administering (102) a single type of an antibiotic comprising a nitroimidazole compound to the microorganism; and administering (103) any of an uronic, aldonic, ulosonic, and aldaric feedstock to the microorganism, wherein the feedstock is adapted to promote cell metabolism and antibiotic activation, and inhibit antibiotic inactivation pathways in the microorganism causing increased sensitivity of the microorganism to the nitroimidazole. In one example, the administering processes (102) and (103) may be sequential. In another example, the administering processes (102) and (103) may be simultaneous. The nitroimidazole compound may comprise any of metronidazole, tinidazole, ornidazole, nimorazole, secnidazole, azanidazole propenidazole, and nitroimidazole derivatives. The feedstock may comprise a sugar acid or a combination of sugar acids comprising any of an uronic, aldonic, ulosonic, and aldaric acid.

The method may comprise metabolizing gluconate from the glucuronic acid by producing adenosine triphosphate (ATP) and reduced ferredoxin. The feedstock may be adapted to decrease production of NADH and NADPH in the microorganism. The method may comprise activating the nitroimidazole compound causing metabolic activation of the microorganism. The method may comprise administering the feedstock as a supplement for oral antibiotics. The feedstock may comprise an aqueous solution or a solid form. The method may comprise decontaminating the microorganism. The method may comprise administering the feedstock by intravenous injection, subcutaneous injection, or intraperitoneal injection.

FIG. 3B is a flow diagram illustrating a method 150 for treatment, according to an embodiment herein. The method 150 comprises providing (151) tumor cells; administering (152) a single type of antibiotic or antibiotics to specific cells of the tumor cells; administering (153) any of an uronic, aldonic, ulosonic, and aldaric feedstock to the specific cells of the tumor cells; and controlling (154) a production of NADH and NADPH in the specific cells of the tumor cells, wherein the feedstock is adapted to promote cell metabolism and antibiotic activation, and inhibit antibiotic inactivation pathways in the specific cells of the tumor cells causing increased sensitivity of the specific cells to the antibiotic or antibiotics. In one example, the administering processes (152) and (153) may be sequential. In another example, the administering processes (152) and (153) may be simultaneous. The tumor cells may comprise any of colorectal tumor cells, stomach tumor cells, brain tumor cells, lung tumor cells, pancreatic tumor cells, liver tumor cells, prostate tumor cells, tumor cells of neck, breast tumor cells, and tumor cells of the oral cavity. The antibiotic or antibiotics may comprise any of metronidazole, tinidazole, ornidazole, nimorazole, secnidazole, azanidazole propenidazole, and nitroimidazole derivatives. The feedstock may comprise a sugar acid or a combination of sugar acids comprising any of an uronic, aldonic, ulosonic, and aldaric acid.

The method may comprise metabolizing gluconate from the glucuronic acid by producing ATP and reduced ferredoxin. The method may comprise activating the antibiotic or antibiotics causing metabolic activation of the tumor cells. The method may comprise administering the feedstock as a supplement for oral antibiotics. The feedstock may comprise an aqueous solution or a solid form. The method may comprise administering the feedstock by intravenous injection, subcutaneous injection, or intraperitoneal injection. The method may comprise administering the feedstock before or during administering radiation on the tumor cells.

The embodiments herein decrease the concentration of nitroimidazole antibiotic required for treatment through the use of naturally occurring feedstocks. The embodiments herein increase the susceptibility of the targeted cells to nitroimidazoles, without requiring an additional antibiotic to be administered. By utilizing specific naturally occurring feedstocks as compared to synthetic chemicals or additional antibiotics, the embodiments herein decrease the chance of possible side effects to the patient and decrease the cost of production.

Furthermore, the embodiments herein decrease the concentration of the Nitroimidazole antibiotic required for treatment by targeting specific cells for susceptibility as compared to natural flora. Targeting occurs because not all bacteria can grow on the same feedstock and there for can be tailored for bacteria of interest. This may decrease antibiotic production costs and possible patient side effects (e.g., diarrhea, intestinal inflammation, liver damage, etc.). Additionally, by controlling the cells NADH production, the embodiments herein may decrease antibiotic resistance through the inhibition of antibiotic breakdown which requires energy input.

The embodiments herein may be used in various capacities, including as a treatment for numerous types of infections, control of microbiomes to support health and improve performance, as well as for decontamination of biohazardous environments. Additionally, the tailored feedstock used by the embodiments herein may be used as an additive to suppositories, topical creams, injections, and liquid oral antibiotics emulsions. The tailored feedstock may be administered as a supplement for oral antibiotics such as an "antibiotic chaser" in a shake form or drink form, in various examples. Additionally, the tailored feedstock may be made as a shake or additive to a diet plan for meals prepared for the patient to support antibiotic susceptibility.

Furthermore, the embodiments herein may be used as a feedstock to make the bacterial infection more susceptible to nitroimidazoles through the control of the metabolic flux of NADH/NADPH by acting as an active ingredient to improve antibiotic activity and reduce antibiotic inactivation. The method provided by the embodiments herein offers a unique solution in that it may be used as a feedstock and active ingredient and not an additive for hydration/moisturizing and/or as part of a salt for the antibiotic as a PPI to help deal with the pH in the patient's stomach.

The embodiments herein increase the antibiotic sensitivity by feeding cells (e.g., microorganisms, multicellular organisms, and/or tumor cells) substrates that promote metabolism and antibiotic activation but inhibit pathways required for antibiotic inactivation and/or repair of antibiotic damage.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A method for treatment of tumor cells by increasing the tumor cells' sensitivity to nitroimidazole antibiotics comprising:
   providing tumor cells;
   administering an antibiotic composition comprising a nitroimidazole compound to the tumor cells; and
   separately administering, from the antibiotic composition, a feedstock composition comprising a sugar acid selected from the group consisting of an uronic, aldonic, ulosonic, and aldaric, or any salt thereof, to the tumor cells.

2. The method of 1, wherein the antibiotic composition is administered before the feedstock composition to the tumor cells.

3. The method of 1, further comprising:
   administering radiation to the tumor cells after the antibiotic composition and the feedstocks have each been administered.

4. The method of claim 1, wherein the tumor cells comprise any of colorectal tumor cells, stomach tumor cells, brain tumor cells, lung tumor cells, pancreatic tumor cells, liver tumor cells, prostate tumor cells, tumor cells of neck, breast tumor cells, and tumor cells of the oral cavity.

5. The method of claim 1, wherein the nitroimidazole compound comprises any of metronidazole, tinidazole, ornidazole, nimorazole, secnidazole, azanidazole propenidazole, and nitroimidazole derivatives.

6. The method of claim 1, wherein the feedstock composition comprises a combination of two or more sugar acids selected from the group consisting of uronic, aldonic, ulosonic, and aldaric acid, or any salt thereof.

7. The method of claim 1, wherein the feedstock composition comprises gluconate or galacturonic acid.

8. The method of claim 1, comprising administering the feedstock composition as a supplement for oral antibiotics.

9. The method of claim 1, wherein the feedstock composition comprises an aqueous solution or a solid form.

10. The method of claim 1, comprising administering the feedstock composition by intravenous injection, subcutaneous injection, or intraperitoneal injection.

11. The method of 1, further comprising: delivering radiation to the tumor cells.

12. The method of claim 11, comprising administering the feedstock composition before or during administering radiation on the tumor cells.

13. The method of claim 1, wherein no glucose is administered to the tumor cells for the tumor cells to metabolize the nitroimidazole compound.

14. The method of claim 1, wherein sugar acid comprises 0.5% (by vol.) of the feedstock composition administered to the tumor cells.

15. The method of claim 1, wherein the nitroimidazole compound comprises an imidazole ring with a nitro-group (—$NO_2$) located at the 5'-position of the imidazole ring.

* * * * *